Dec. 14, 1943.  J. D. MATTIMORE  2,336,694
VALVE
Filed July 2, 1942
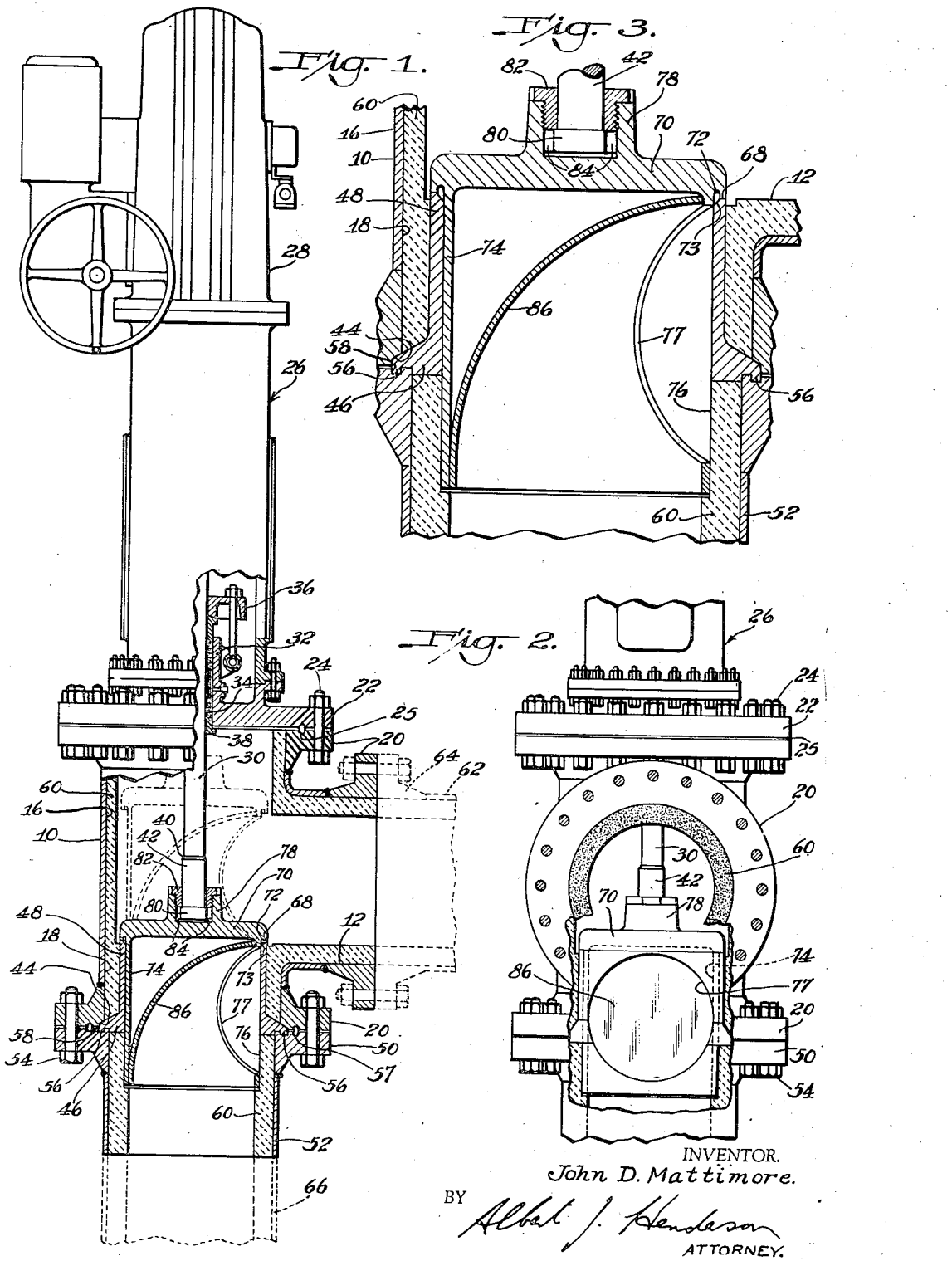
INVENTOR.
John D. Mattimore.
BY Albert J. Henderson
ATTORNEY.

Patented Dec. 14, 1943

2,336,694

UNITED STATES PATENT OFFICE 2,336,694

VALVE

John D. Mattimore, Greensburg, Pa., assignor to Walworth Patents Inc., Boston, Mass., a corporation of Massachusetts Application July 2, 1942, Serial No. 449,402

5 Claims. (Cl. 251—156)

This invention relates to valves and more particularly to large capacity valves for controlling fluids under pressure and extremely high temperatures.

One object of the invention is to reduce the weight and cost of the valve and conserve materials while providing adequate strength and minimum heat loss.

Another object of the invention is to secure high resistance to injurious effects of the high temperature fluids on the valve structure.

Another object of the invention is to render parts exposed directly to the high temperature fluids to be replaced when disintegrated or worn, without reconstruction or rebuilding of the entire valve structure.

Another object of the invention is to reduce turbulence or cavitation of the fluid while passing through the valve and secure a streamline flow.

Other objects and advantages will become apparent from the following description taken in connection with the accompanying drawing wherein:

Fig. I is a front elevation partly in section of the valve structure,

Fig. II is a partial side elevation with parts broken away, and

Fig. III is an enlarged fragmentary sectional view of the valve member and seat.

Referring more particularly to the drawing, the valve comprises a tubular shell 10 in the form of a welding pipe T of wrought steel. The shell 10 preferably has the lateral opening 12 thereof positioned equi-distant the upper and lower open ends 16 and 18 respectively, although a non-symmetrical arrangement can be utilized if desired. At each of the open ends 16 and 18, and at the lateral outlet 12, is a welding neck flange 20 also of wrought steel secured by a circumferential line of welding to the open ends of the shell 10 with the opening therethrough in registry with the adjacent openings through the shell.

The flange 20 secured to the open end 16 serves to support a valve bonnet 22 which is secured thereto by means of the bolts 24 with the usual gasket 25 inserted therebetween. The bonnet 22 supports the valve operating mechanism, designated generally by the reference numeral 26, and which, in this instance, includes power operating means 28 of any suitable construction. The valve stem 30 which projects into the tubular shell 10 through the bonnet 22 is adapted for reciprocatory movement by the valve operating mechanism 28 but is maintained against rotation thereby. The valve bonnet 22 may be provided with the usual stuffing box 32 within which suitable packing 34 is compressed against the valve stem by means of the packing gland 36 carried by the upper end of the stuffing box. A back seating nut 38 threadedly engages with the bonnet 22 at the lower end of the stuffing box for supporting the packing assembly and has seating engagement with a tapered seat 40 formed on an enlarged portion 42 of the valve stem 30 when the stem is reciprocated to bring these parts into such relation.

The flange 20 secured to the open end 18 of the tubular shell 10 is provided with an engaging portion in the form of a chamfered inner edge 44 for engagement with a flange 46 formed on one end of a tubular valve seat 48 of heat resisting alloy steel. The flange 46 seats upon a welding neck flange 50 of wrought steel carrying a pipe extension 52 secured thereto by a circumferential line of welding as in the case of the flange 20. The flange 50 is secured to the flange 20 adjacent the open end 18 by means of bolts 54 and the flange 46 of the tubular valve seat is clamped therebetween. Preferably, the opening through flange 50 is of smaller diameter than the opening of related flange 20 and a tongue and groove joint is provided between the flange 46 of the valve seat and the flange 50. This joint may conveniently be formed by a tongue 56 formed on the flange 46 and closely fitting within an annular groove 58 formed on the flange 50. In addition, the opposing faces of the flange 50 and flange 20 may be grooved for the accommodation of a ring 57 forming a joint therebetween when the bolts 54 are secured.

The tubular valve seat 48 projects within the tubular shell 10 and is spaced from the adjacent wall of the shell 10 to accommodate a lining 60 of insulating material preferably in the form of a heat resistant cement. This lining 60 extends completely around the inner surface of the tubular shell 10, including the flanges 20 and extension 52, and follows the outlines thereof leaving a passage through the shell registrable with the passage through lined pipes and which convey the fluid being controlled by the valve of this invention. As designated in broken lines in Fig. I, a lined pipe 62 may be secured by means of a flanged connection 64 to the flange 20 adjacent the lateral outlet 12 and a similar lined pipe 66 may be secured by welding to the extension 52.

The end of the tubular valve seat 48 opposite the flange 46 thereon forms a valve seat 68 projecting slightly beyond the margin of the lined lateral opening 12 and is adapted to be engaged by a valve member 70 of heat resisting alloy steel carried by the valve stem 30. As shown more clearly in Fig. III, valve member 70 is provided with an annular undercut portion 72 adjacent the valve seat 68 which is also provided with a clearance in the form of a chamfered edge 73 at this point. The valve member 70 has an integral guide portion 74 immediately adjacent the undercut 72 which is of hollow cylindrical form which slidably engages the inner wall of the valve seat and projects beyond the flange 46 at the opposite end thereof when the valve is engaged with its seat 68. Thus, the passage through the lining of the extension 52 and flange 50 is enlarged, as indicated at 76, for a portion of its length to register with the opening through the tubular valve seat 48 and receive the projecting end of the guide 74. Preferably, a slight clearance is provided at the bottom of the enlarged opening 76 of the lining for the end of the guide 74 in order that there will be no interference with seating of the valve member 70 on its seat 68.

The guide portion 74 extends across the lateral opening 12 when the valve is in open position, as indicated in broken lines in Fig. I. A port 77 is provided in one side of the hollow guide portion 74 to permit flow of fluid between the passages in the shell in the open position; this port having an area substantially the same as the lateral opening 12. Any suitable form of connection may be provided between the valve member 70 and the stem 30, and in this instance, the valve member 70 is provided with a socket 78 within which a head 80 terminating the enlarged portion 42 of the valve stem 30 is received and secured by means of the nut 82. In order to prevent relative rotation between the valve stem 30 and the valve member 70, the head 80 is provided with oppositely disposed lugs 84 engaged with suitable slots provided in the socket 78 for the purpose or other suitable rotation preventing means may be used.

The valve member 70 is adapted to be reciprocated across the lateral opening 12 to control the flow of fluid through the shell. The abrupt change in direction of flow due to the angular formation of the passages may produce turbulence or cavitation. A streamline flow is secured in this connection by providing the guide 74 with a deflector plate 86 of curved form which is secured by welding around its periphery to the underside of the valve member 70 and the inner surface of the guide 74 respectively and extending diagonally from adjacent the upper junction of port 77 to the opposite end wall.

The valve structure described is adapted for use with fluids under pressure and at temperatures in the neighborhood of 1400 degrees Fahrenheit. It is also capable of handling large volumes of such fluids. For example, the tubular shell 10 may be over two feet in diameter and, if constructed of steel capable of withstanding such elevated temperatures without carbonization, would entail great expense. In this invention, the shell 10 is constructed of ordinary carbon steel subject to more or less rapid carbonization if subjected to elevated temperatures but which does not occur due to the lining 60 of heat resistant cement. The valve member 70, guide 74 and deflector plate 86 are preferably constructed of heat-resistant alloy steel as is the tubular valve seat 48 and the life of these parts under the severe conditions of use is prolonged. It will be observed that when the valve member is either open or closed that no portion of the shell 10 or flanges 20 connected thereto are exposed to the fluid under high temperature but such parts are protected by the lining provided for this purpose. Moreover, as the lining 60 is of substantial thickness the heat of the fluid passing through the valve is not dissipated and the heat losses are comparatively small.

It will be understood that many changes may be made in the details of construction, arrangement of parts and materials used which are shown and described herein for illustrative purposes and that the invention is not to be limited to the forms disclosed but is to be accorded the full scope of the appended claims.

I claim:

1. A valve for high temperature fluids comprising a tubular shell having a lateral opening, a lining of insulating material in said shell, a tubular valve seat of heat resisting metal extending from one end of said shell along the inner surface of said lining and terminating substantially flush with the adjacent margin of said lined lateral opening, a valve member of heat resisting metal movable relatively to said valve seat across said lateral opening to control flow of fluid through said shell, and a guide element on said valve member slidable within said valve seat and having a port adapted to register with said lateral opening.

2. A valve for high temperature fluids comprising a tubular shell having a lateral opening, a lining of insulating material in said shell, a tubular valve seat of heat resisting metal extending from one end of said shell along the inner surface of said lining and terminating substantially flush with the adjacent margin of said lined lateral opening, a valve member of heat resisting metal movable relatively to said valve seat across said lateral opening to control flow of fluid through said shell, and a guide element on said valve member slidable within said valve seat and having a port adapted to register with said lateral opening, and a deflector in said guide for directing flow of fluid through said port and opening.

3. A valve for high temperature fluids comprising a tubular shell having a lateral opening intermediate the ends thereof, a lining of insulating material in said shell, a detachable connection at one end of said shell having a lining registrable with the lining of a pipe connected thereto, a tubular valve seat secured by said connection in said end of the shell and extending along the inner surface of said shell lining to the adjacent margin of said lined lateral opening, and a valve member movable relatively to said valve seat across said lateral opening to control the flow of fluid through said shell.

4. A valve for high temperature fluids comprising a tubular shell having a lateral opening intermediate the ends thereof, a lining of insulating material in said shell, a flange welded to said shell at one end and having a lining forming a continuation of said shell lining, an extension portion for said shell having a flange thereon detachably connected to the first said flange, a tubular valve seat clamped between said flanges and extending along the inner surface of said shell and flange lining to the adjacent margin of said lateral opening, a valve member movable relatively to said valve seat across said lateral opening to control the flow of fluid through said shell, a guide element on said valve member slidable within said valve seat and having a port adapted to register with said lateral opening, and a lining for said extension portion extending beyond said valve seat and adapted to receive the end of said guide.

5. A valve for high temperature fluids comprising a tubular shell having a lateral opening intermediate the ends thereof, a separate pipe flange for each end of the shell and the lateral opening, said flanges being permanently secured thereto and forming detachable connecting means thereon, a valve bonnet forming a closure for one end of said shell, valve operating means extending through said bonnet into said shell, a lining of insulating material in said shell and flanges, an extension portion for said shell having a flange thereon detachably connected to the flange at the end opposite said bonnet, a tubular valve seat clamped between said connected flanges and extending along the inner surface of said shell lining to the adjacent margin of said lined lateral opening, a valve member carried by said operating means and movable relatively to said valve seat across said lateral opening to control the flow of fluid through said shell, a guide element on said valve member slidable within said valve seat and having a port adapted to register with said lateral opening, a lining for said extension portion extending beyond said valve seat and adapted to receive the end of said guide, and a deflector in said guide for directing flow of fluid through said port and opening.

JOHN D. MATTIMORE.